United States Patent [19]

Sugawara

[11] Patent Number: 5,066,115
[45] Date of Patent: Nov. 19, 1991

[54] VIEW-FINDING OPTICAL SYSTEM CAPABLE OF EYESIGHT ADJUSTMENT

[75] Inventor: Saburo Sugawara, Kawasaki, Japan
[73] Assignee: Asahi Kogaku Kogyo K.K., Tokyo, Japan
[21] Appl. No.: 426,376
[22] Filed: Oct. 25, 1989

[30] Foreign Application Priority Data

Oct. 26, 1988 [JP] Japan .................. 63-270383

[51] Int. Cl.⁵ .................. G02B 15/14; G03B 13/02; G03B 13/10
[52] U.S. Cl. .................. 359/676; 354/219; 354/222; 354/225
[58] Field of Search .................. 350/423, 427; 354/219, 354/222, 225

[56] References Cited

U.S. PATENT DOCUMENTS

| | | | |
|---|---|---|---|
| 4,217,048 | 8/1980 | Egawa | 350/410 X |
| 4,707,103 | 11/1987 | Ikemori et al. | 354/225 X |
| 4,731,625 | 3/1988 | Nozawa | 354/155 |
| 4,751,539 | 6/1988 | Yamada et al. | 354/222 |
| 4,757,336 | 7/1988 | Nakayama et al. | 350/423 X |

FOREIGN PATENT DOCUMENTS 54-126530 10/1979 Japan .
54-126531 10/1979 Japan .
55-67732 5/1980 Japan .
57-202512 12/1982 Japan .

OTHER PUBLICATIONS

"Symposium on Optical Surface Technology", Ulrich Greis, Gunther Kirchof, *Proceedings*, vol. 381, Apr. 12-14, 1983.

*Primary Examiner*—Scott J. Sugarman
*Attorney, Agent, or Firm*—Sughrue, Mion, Zinn, Macpeak & Seas

[57] ABSTRACT

A view-finding optical system may be used which is simple in construction, employs inexpensive optical materials, and is capable of eyesight adjustment over a range of $-2.5$ to $+1.5$ diopters. A pentaprism is provided closest to the focusing side screen. A negative meniscus lens in provided next to the pentaprism. The surface of the negative meniscus lens closest to the focusing side screen is a convex surface. Additonally, this lens is preferably formed of a polycarbonate resin. A biconvex lens is provided on the other side of the negative meniscus lens. This lens is preferably formed of an acrylic resin. The eyesight is adjusted by moving the biconvex lens along the optical axis while the negative meniscus lens remains in a fixed position.

20 Claims, 7 Drawing Sheets

VIEW-FINDING OPTICAL SYSTEM CAPABLE OF EYESIGHT ADJUSTMENT

BACKGROUND OF THE INVENTION

The present invention relates to a view-finding optical system for use with single-lens reflex cameras, and more particularly, to a view-finding optical system capable of adjusting eyesight by moving part of the eyepiece along the optical axis of the finder.

Single-lens reflex cameras having a view-finding optical system capable of eyesight adjustment are available in various versions. Examples of such view-finding optical systems have been described in JPA-54-126530 (the term "JPA" as used herein means an "unexamined published Japanese patent application") and other patent applications.

However, JPA-54-126530 does not show an explicit example of a lens system that employs optical materials of low refractive indices and difficulty has been encountered in fabricating all-plastic lens components with a view to reducing the production cost. Further, the degree of eyesight adjustment that can be achieved by this lens system is only 3 diopters. This is not completely satisfactory in practical applications.

SUMMARY OF THE INVENTION

The present invention has been accomplished in order to solve the aforementioned problems of the prior art and its principal object is to provide a view-finding optical system that is simple in construction, employs inexpensive optical materials and yet is capable of eyesight adjustment over the range of $-2.5$ to $+1.5$ diopters to insure satisfactory view-finding.

Figure 1:
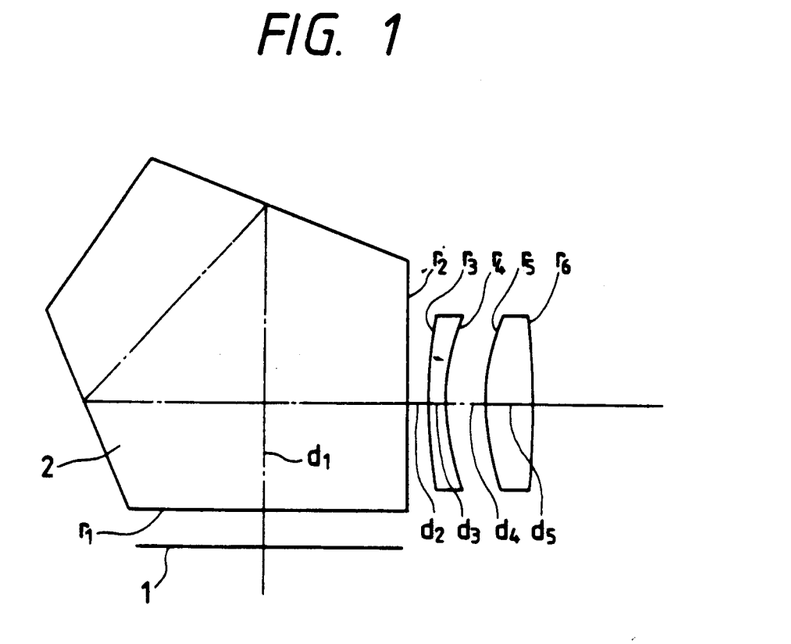
FIG. 1 shows a vertical section of the view-finding optical system of the present invention.

The above-stated object of the present invention can be attained using a view-finding optical system which comprises, in order from the focusing screen 1 side in a single-lens reflex camera, a pentaprism 2, a negative meniscus first lens having a convex surface on the focusing screen side, and a biconvex second lens. This optical system is designed so that eyesight is variable by moving the second lens along the optical axis while the first lens remains fixed Additionally, the following conditions are satisfied:

$$n_3 < 1.6 \tag{1}$$

$$-2 < r_6/r_3 < -0.8 \tag{2}$$

$$1 \leq r_5/r_4 \leq 1.2 \tag{3}$$

where:

$n_3$ is the refractive index of the second lens at the d-line;

$r_3$ is the radius of curvature of the surface of the first lens which is closest to the focusing screen side;

$r_4$ is the radius of curvature of the surface of the first lens which is furthest from the focusing screen side;

$r_5$ is the radius of curvature of the surface of the second lens which is closest to the focusing screen side; and $r_6$ is the radius of curvature of the surface of the second lens which is furthest from the focusing screen side.

In order to reduce the production cost and weight of the view-finding optical system having the composition described above, the first and second lenses are desirably formed of a polycarbonate resin and an acrylic resin, respectively.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

The lens construction according to the present invention is described in the Summary section hereinabove. The three conditions to be satisfied by the optical system of the present invention are described below.

Condition (1): $n_3 < 1.6$

Condition (1) relates to the refractive index of the second lens and must be satisfied to realize cost reduction. An optical material that has a high Abbe number and which is particularly low in price, such as an acrylic resin or BK7 (in the case of glass) has a refractive index of less than 1.6. Optical materials that do not satisfy this condition are undesirably expensive.

Condition (2): $-2 < r_6/r_3 < -0.8$

Condition (2) relates to the ratio between the radius of curvature of the surface of the first lens which is closest to the focusing screen surface (i.e., $r_3$) and that of the surface of the second lens which is furthest from the focusing screen (i.e., $r_6$). If $r_6/r_3$ is equal to or smaller than $-2$, coma can satisfactorily be compensated for but spherical aberration will become undercompensated. Conversely, if $r_6/r_3$ is equal to or greater than $-0.8$, spherical aberration can be compensated for fairly easily but coma cannot be effectively compensated for.

Condition (3): $1 \leq r_5/r_4 \leq 1.2$

Condition (3) relates to the ratio between the radius of curvature of the surface of the first lens which is furthest from the focusing screen (i.e., $r_4$) and that of the opposing surface of the second lens which is closest to the focusing screen (i.e., $r_5$). If $r_5/r_4$ is equal to or smaller than 1, coma can be satisfactorily compensated for, but spherical aberration becomes undercompensated. Conversely, if $r_5/r_4$ is equal to or greater than 1.2, spherical aberration can be compensated for fairly easily, but coma cannot be effectively compensated for.

Therefore, conditions (2) and (3) must be satisfied in order to compensate for spherical aberration and coma in a balanced way.

If the first lens if formed of a polycarbonate resin and the second lens is formed of an acrylic resin (as in Example 2 to be described below), not only can cost reduction be realized, but also the weight of the overall system is reduced.

Two examples of the present invention are described below in the tables, wherein $r_i$ is the radius of curvature of the $i^{th}$ surface as counted from the focusing screen side, $d_i$ is the distance between the $i^{th}$ surface and the $(i+1)^{th}$ surface, $n_j$ is the refractive index at the d-line of the $j^{th}$ optical material; and $v_j$ is the Abbe number of the $j^{th}$ optical material.

EXAMPLE 1

| Surface No. | $r_i$ | $d_i$ | $n_j$ | $v_j$ |
|---|---|---|---|---|
| 1 | ∞ | 77.41 | 1.51633 | 64.1 |
| 2 | ∞ | 2 | | |
| 3 | 39.396 | 1.5 | 1.76182 | 26.5 |
| 4 | 24.902 | 1.747~6.292 | | |
| 5 | 23 | 4 | 1.51633 | 64.1 |
| 6 | −68.439 | | | | where: Distance from screen to the first surface : 3.1
Distance from the eighth surface
to eyepoint : 20.953−16.408
Effective field of view : 92%
$r_6/r_3 = -1.737$
$r_5/r_4 = 1.100$ where:
Distance from screen to the first surface : 3.1
Distance from the eighth surface to eyepoint : 20.953−16.408
Effective field of view: 92%
$r_6/r_3 = -1.737$
$r_5/r_4 = 1.100$

EXAMPLE 2

| Surface No. | $r_i$ | $d_i$ | $n_j$ | $v_j$ |
|---|---|---|---|---|
| 1 | ∞ | 77.41 | 1.51633 | 64.1 |
| 2 | ∞ | 1.5 | | |
| 3 | 50.752 | 2 | 1.58547 | 29.9 |
| 4 | 20.5 | 1.747~6.292 | | |
| 5 | 23 | 4 | 1.49186 | 57.4 |
| 6 | −57.456 | | | | where: Distance from screen to the first surface : 3.1
Distance from the eighth surface
to eyepoint : 20.753−16.208
Effective field of view : 92%
$r_6/r_3 = -1.132$
$r_5/r_4 = 1.122$ Example 2 shows one of the least costly designs that can be realized using a polycarbonate resin in the first lens and an acrylic resin in the second lens.

FIG. 1 shows a vertical section of the view-finding optical system of EXAMPLE 1. Reference number 1 is a focusing screen. Reference numeral 2 shows a pentaprism. Lens 3 is a negative meniscus lens having a convex surface on the side closest to the focusing screen. Lens 4 is a biconvex lens. This optical system is designed so that eyesight is variable by moving lens 4 along the optical axis while lens 3 remains fixed.

Figure 2:
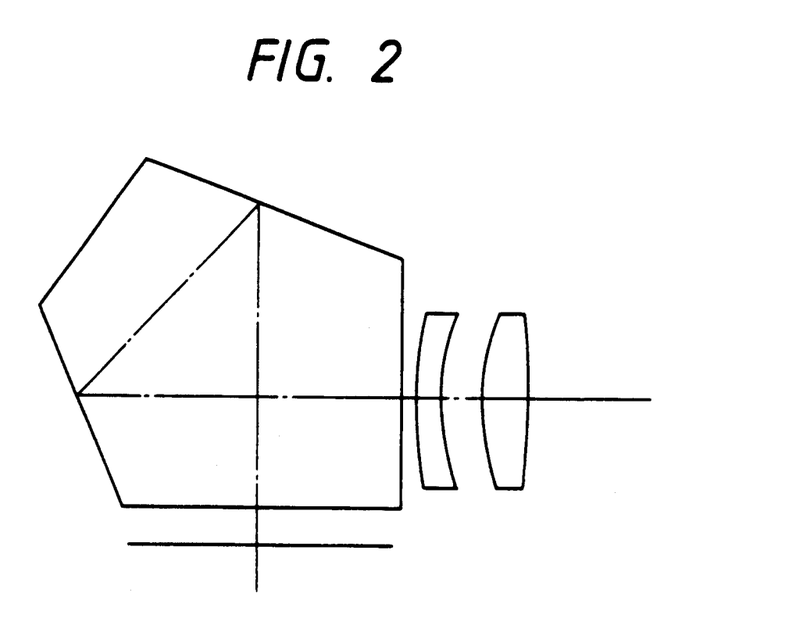
FIG. 2 shows a vertical section of the view-finding optical system of the present invention according to a second embodiment.

FIG. 2 shows a vertical section of the view-finding optical system of Example 2. The elements of the optical system shown in FIG. 2 are similar to the elements shown in FIG. 1 except that these elements comply with the specifications given in reference to Example 2. Eyesight is variable in the same manner as in the FIG. 1 apparatus. Additionally, the negative meniscus lens may be formed of a polycarbonate resin and the biconvex lens may be formed of an acrylic lens to realize a design which is very low in cost.

Figure 3:
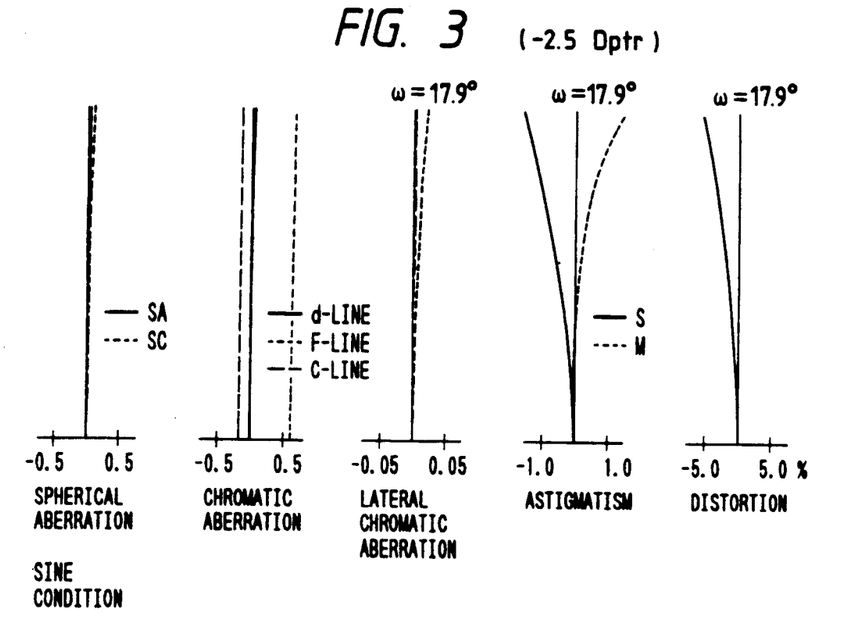
FIG. 3 is a graph plotting aberration curves obtained using the view-finding optical system of the first embodiment in which eyesight is adjusted for a diopter value of $-2.5$ diopters.
Figure 4:
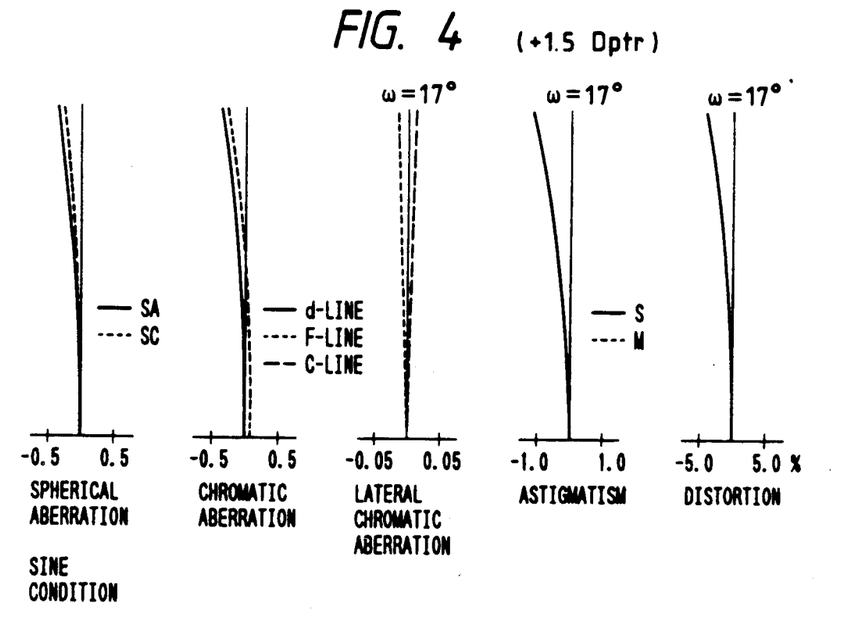
FIG. 4 is a graph plotting aberration curves obtained using the view-finding optical system of the first embodiment in which eyesight is adjusted for a diopter value of $+1.5$ diopters.
Figure 5:
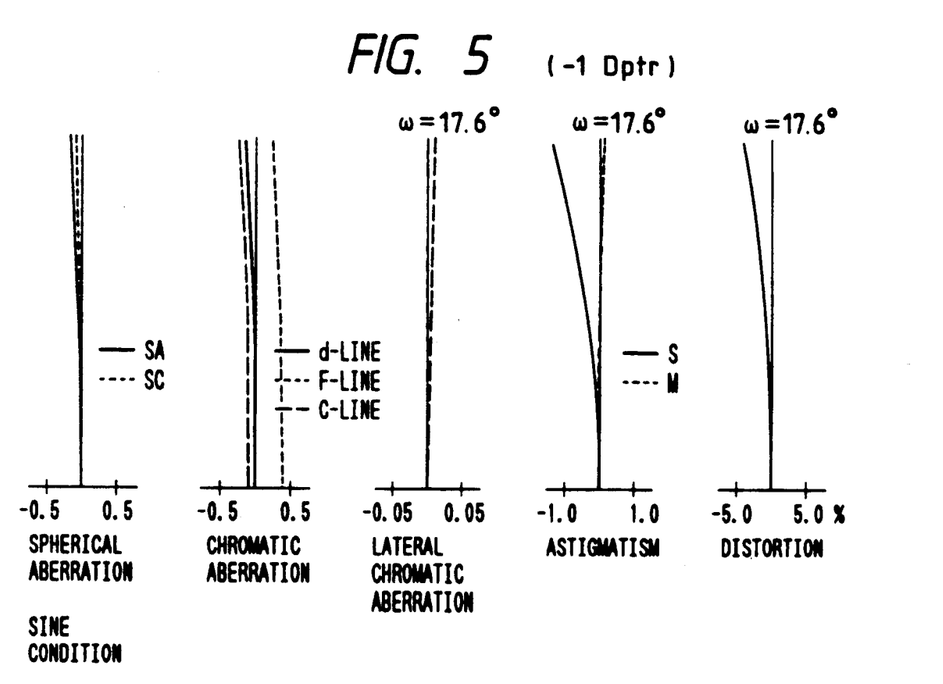
FIG. 5 is a graph plotting aberration curves obtained using the view-finding optical system of the first embodiment in which eyesight is adjusted for a diopter value of $-1$ diopters.

FIGS. 3–5 are graphs plotting aberration curves obtained using the view-finding optical system according to the Example 1 embodiment shown in FIG. 1. Eyesight is adjusted for diopter values of −2.5, +1.5 and −1, in Figs. 3, 4 and 5, respectively.

Figure 6:
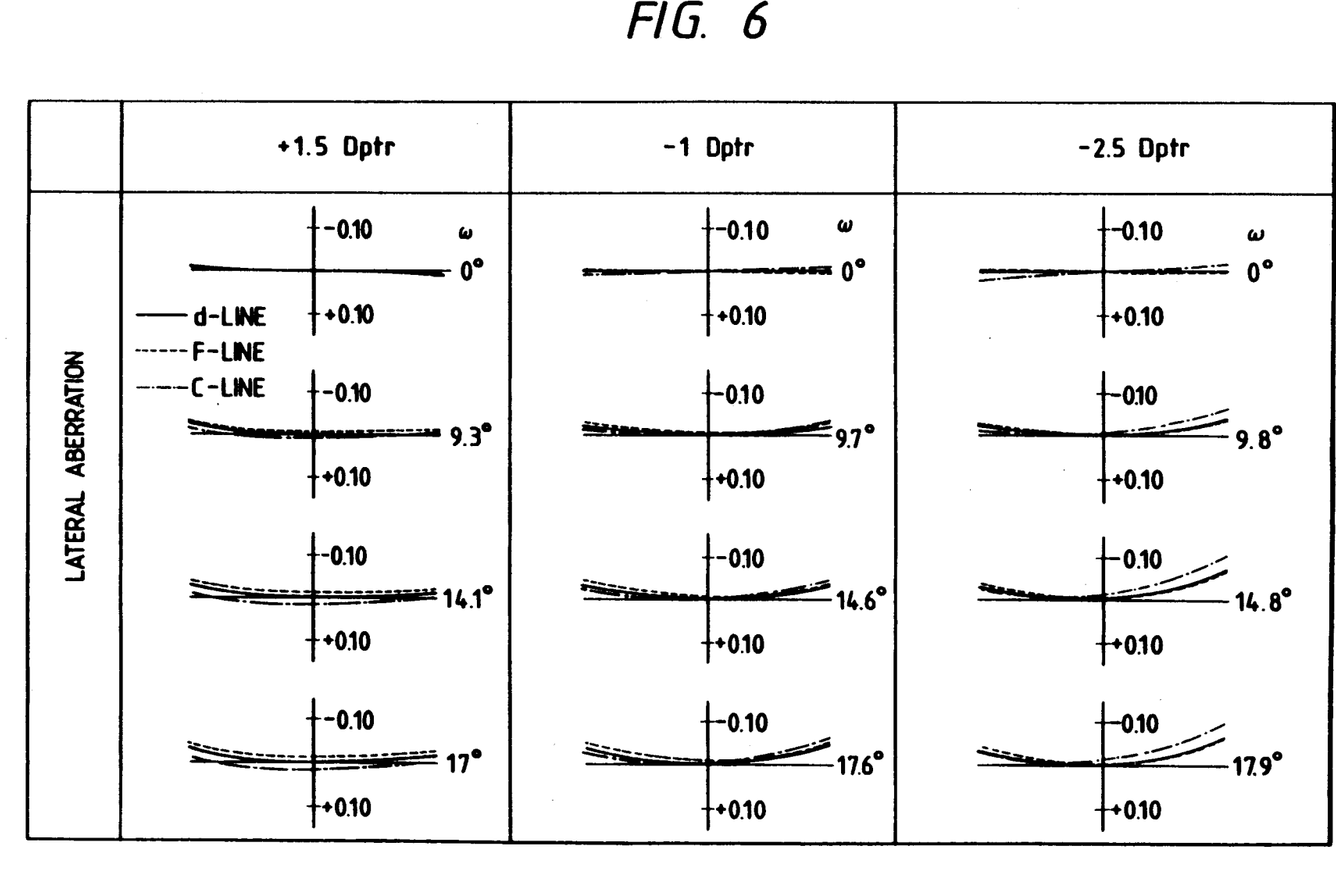
FIG. 6 is a graph plotting lateral aberration curves obtained using the optical system of the first embodiment for diopter values of $-2.5$, $+1.5$ and $-1$ diopters.

FIG. 6 is a graph plotting lateral aberration curves obtained using the optical system of the first embodiment shown in FIG. 1 for diopter values of −2.5, +1.5 and −1.

Figure 7:
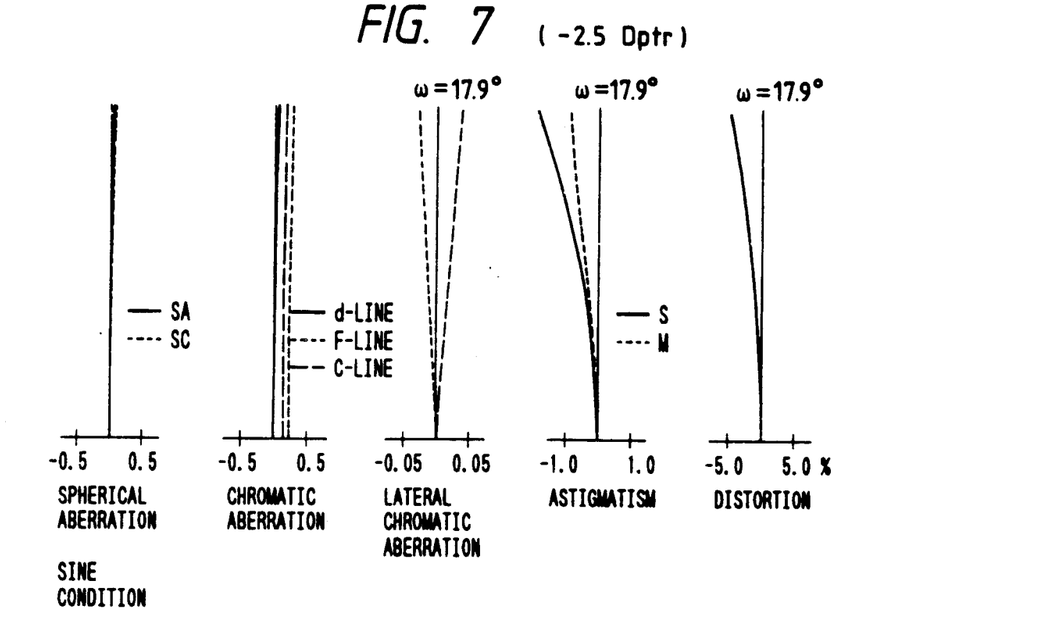
FIG. 7 is a graph plotting aberration curves obtained using the view-finding optical system of the second embodiment in which eyesight is adjusted for a diopter value of $-2.5$ diopters.
Figure 8:
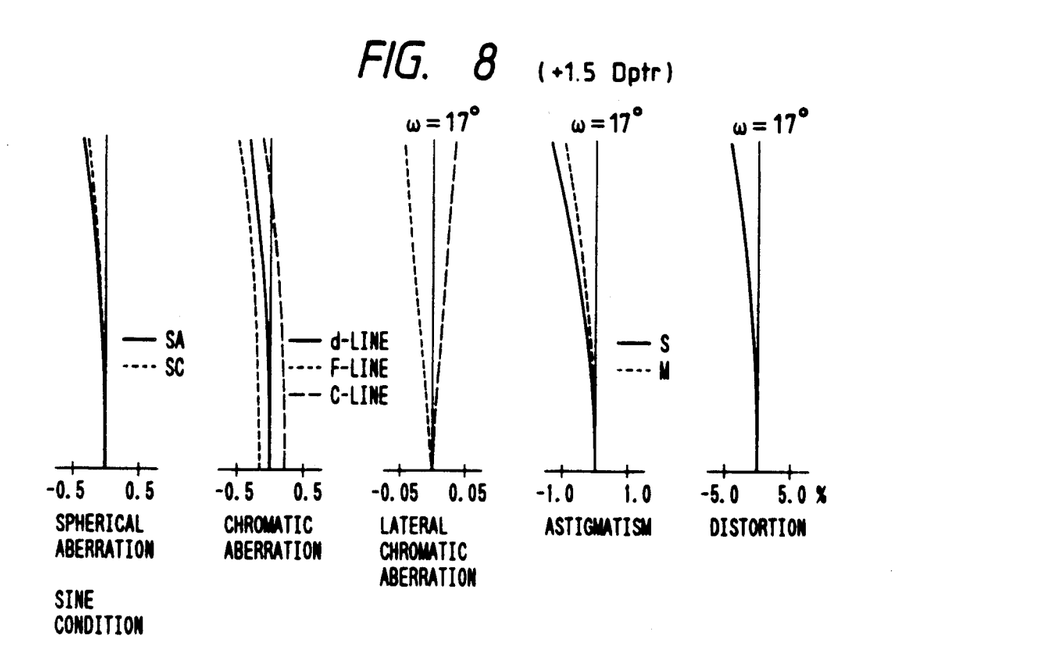
FIG. 8 is a graph plotting aberration curves obtained using the view-finding optical system of the second embodiment in which eyesight is adjusted for a diopter value of $+1.5$ diopters.
Figure 9:
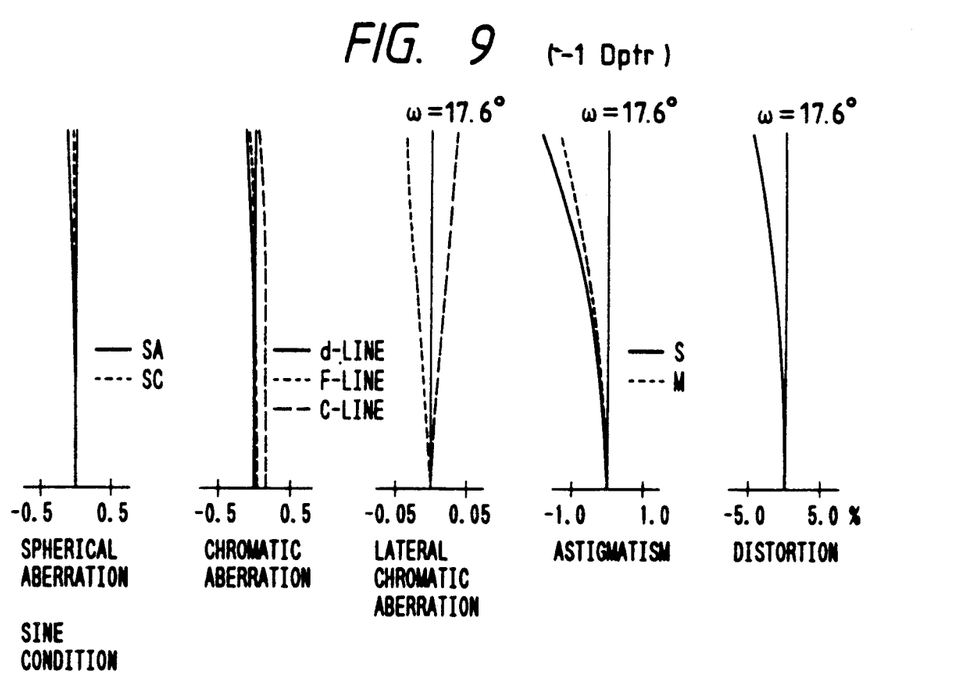
FIG. 9 is a graph plotting aberration curves obtained using the view-finding optical system of the second embodiment in which eyesight is adjusted for a diopter value of $-1$ diopters.

FIGS. 7–9 are graphs plotting aberration curves obtained using the view-finding optical system according to the Example 2 embodiment shown in FIG. 2. Eyesight is adjusted for diopter values of −2.5, +1.5 and −1 in Figs. 7, 8 and 9, respectively.

Figure 10:
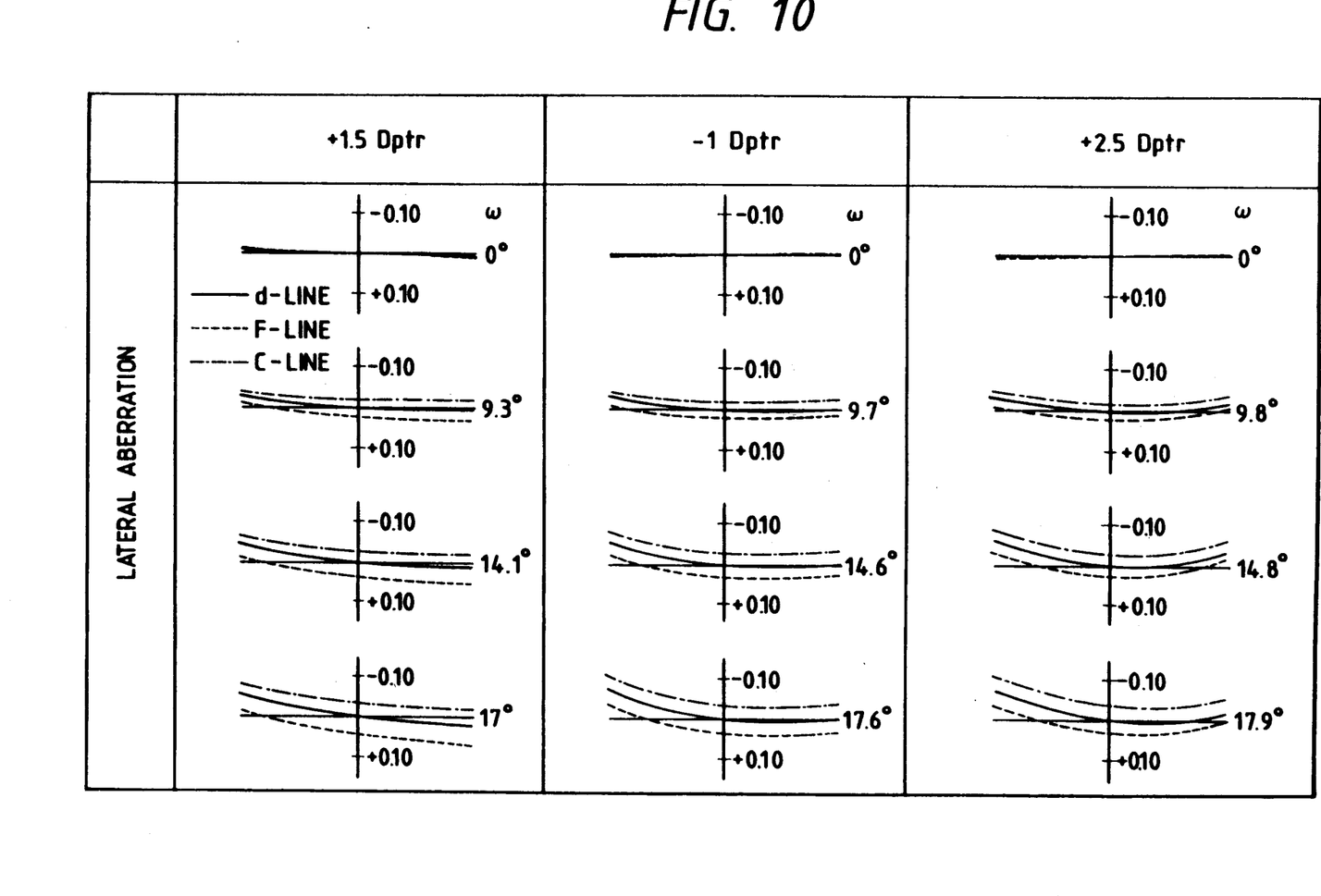
FIG. 10 is a graph plotting lateral aberration curves obtained using the optical system of the second embodiment for diopter values of $-2.5$, $+1.5$ and $-1$ diopters.

FIG. 10 is a graph plotting lateral aberration curves obtained using the optical system of the second embodiment shown in FIG. 2 for diopter values of −2.5, +1.5 and −1.

The aberration curves plotted in FIGS. 3–10 were obtained by tracing from the eye ring side with the diameter of the eye ring being assumed to be 4mm.

As described above, the present invention provides a view-finding optical system that is simple in lens composition and uses inexpensive optical materials and yet is capable of adjusting eyesight over a broad range of from 1.5 to −2.5 diopters. Further, as is clear from the accompanying graphs plotting aberration curves, this optical system has a high performance and insures efficient view-finding.

What is claimed is:

1. A view-finding optical system capable of eyesight adjustment comprising, in order to form a focusing screen side:
   a pentaprism;
   a negative meniscus first lens having a convex surface on the focusing screen side; and
   a biconvex second lens;
   wherein eyesight may be adjusted by moving the second lens along an optical axis while the first lens is in a fixed position; and
   wherein a ratio of a radius of curvature of a surface of the second lens furthest from said focusing screen side to a radius of curvature of a surface of the first lens closest to the focusing side screen is greater than −2 and less than −0.8.

2. An optical system as claimed in claim 1, said optical system further satisfying the following conditions:

$n_3 < 1.6;$ and $1 \leq r_5/r_4 \leq 1.2;$ where:
- $n_3$ is the refractive index of the second lens at the d-line;
- $r_4$ is the radius of curvature of the surface of the first lens which is furthest from the focusing screen side;
- $r_5$ is the radius of curvature of the surface of the second lens which is closest to the focusing screen side.

3. An optical system as claimed in claim 1, wherein said first lens is formed of a polycarbonate resin and said second lens is formed of an acrylic resin.

4. An optical system as claimed in claim 2, wherein said first lens is formed of a polycarbonate resin and said second lens is formed of an acrylic resin.

5. An optical system as claimed in claim 1, wherein said eyesight may be adjusted over a range of −2.5 to 1.5 diopters.

6. An optical system as claimed in claim 1, wherein a refractive index of the second lens is less than 1.6.

7. An optical system as claimed in claim 1, wherein said focusing side screen is included in a single-lens reflex camera.

8. An optical system as claimed in claim 2, satisfying the following tables, wherein $r_i$ is the radius of curvature of the $i^{th}$ surface as counted from the focusing screen side, $d_i$ is the distance between the $i^{th}$ surface and the $(i+1)^{th}$ surface, $j_j$ is the refractive index at the d-line of the $j^{th}$ optical material; and $v_j$ is the Abbe number of the $h^{th}$ optical material;

| Surface No. | $r_i$ | $d_i$ | $n_j$ | $v_j$ |
|---|---|---|---|---|
| 1 | ∞ | 77.41 | 1.51633 | 64.1 |
| 2 | ∞ | 2 | | |
| 3 | 39.396 | 1.5 | 1.76182 | 26.5 |
| 4 | 20.902 | 1.747∼6.292 | | |
| 5 | 23 | 4 | 1.51633 | 64.1 |
| 6 | −68.439 | | | | where: Distance from screen to the first surface : 3.1
Distance from the eighth surface
to eyepoint : 20.953−16.408
Effective field of view : 92%
$r_6/r_3 = -1.737$
$r_5/r_4 = 1.100.$ 9. An optical system as claimed in claim 2, satisfying the following tables, wherein $r_i$ is the radius of curvature of the $i^{th}$ surface as counted from the focusing screen side, $d_i$ is the distance between the $i^{th}$ surface and the $(i+1)^{th}$ surface, $n_j$ is the refractive index at the d-line of the $j^{th}$ optical material; and $v_j$ is the Abbe number of the $j^{th}$ optical material;

| Surface No. | $r_i$ | $d_i$ | $n_j$ | $v_j$ |
|---|---|---|---|---|
| 1 | ∞ | 77.41 | 1.51633 | 64.1 |
| 2 | ∞ | 1.5 | | |
| 3 | 50.752 | 2 | 1.58547 | 29.9 |
| 4 | 20.5 | 1.747∼6.292 | | |
| 5 | 23 | 4 | 1.49186 | 57.4 |
| 6 | −57.456 | | | | where: Distance from screen to the first surface : 3.1
Distance from the eighth surface
to eyepoint : 20.753−16.208
Effective field of view : 92%
$r_6/r_3 = -1.132$

| Surface No. | $r_i$ | $d_i$ | $n_j$ | $v_j$ |
|---|---|---|---|---|

-continued $r_5/r_4 = 1.122.$

10. An optical system as claimed in claim 3, wherein a refractive index of the second lens is less than 1.6.

11. A view-finding optical system capable of eyesight adjustment comprising, in order from a focusing screen side:
- a pentaprism;
- a negative meniscus first lens having a convex surface on the focusing screen side; and
- a biconvex second lens;
- wherein eyesight may be adjusted by moving the second lens along an optical axis while the first lens is in a fixed position; and
- wherein a ratio of a radius of curvature of a surface of the second lens closest to said focusing screen side to a radius of curvature of a surface of the first lens furthest from said focusing screen side is greater than or equal to 1 and is less than or equal to 1.2, and
- wherein said system satisfies the condition $n_3 < 1.6;$ where
- $n_3$ is the refractive index of the second lens at the d-line.

12. An optical system as claimed in claim 11, said optical system further satisfying the following conditions:

$-2 < r_6/r_3 < -0.8;$ where
- $r_3$ is the radius of curvature of the surface of the first lens which is closest to the focusing screen side; and
- $r_6$ is the radius of curvature of the surface of the second lens which is furthest from the focusing screen side.

13. An optical system as claimed in claim 11, wherein said first lens is formed of a polycarbonate resin and said second lens is formed of an acrylic resin.

14. An optical system as claimed in claim 12, wherein said first lens is formed of a polycarbonate resin and said second lens is formed of an acrylic resin.

15. An optical system as claimed in claim 11, wherein said eyesight may be adjusted over a range of −2.5 to 1.5 diopters.

16. An optical system as claimed in claim 11, wherein a refractive index of the second lens is less than 1.6.

17. An optical system as claimed in claim 13, wherein a refractive index of the second lens is less than 1.6.

18. An optical system as claimed in claim 11, wherein said focusing side screen is included in a single-lens reflex camera.

19. An optical system as claimed in claim 12, satisfying the following tables, where $r_i$ is the radius of curvature of the $i^{th}$ surface as counted from the focusing screen side, $d_i$ is the distance between the $i^{th}$ surface and the $(i+1)^{th}$ surface, $n_j$ is the refractive index at the d-line of the $j^{th}$ optical material; and $v_j$ is the Abbe number of the $j^{th}$ optical material;

| Surface No. | $r_i$ | $d_i$ | $n_j$ | $\nu_j$ |
| --- | --- | --- | --- | --- |
| 1 | ∞ | 77.41 | 1.51633 | 64.1 |
| 2 | ∞ | 2 | | |
| 3 | 39.396 | 1.5 | 1.76182 | 26.5 |
| 4 | 20.902 | 1.747 | ~6.292 | |
| 5 | 23 | 4 | 1.51633 | 64.1 |
| 6 | −68.439 | | | | where: Distance from screen to the first surface : 3.1
Distance from the eighth surface
to eyepoint : 20.953–16.408
Effective field of view : 92%
$r_6/r_3 = -1.737$.

20. An optical system as claimed in claim 12, satisfying the following tables, wherein $r_i$ is the radius of curvature of the $i^{th}$ surface as counted from the focusing screen side, $d_i$ is the distance between the $i^{th}$ surface and the $(i+1)^{th}$ surface, $n_j$ is the refractive index at the d-line of the $j^{th}$ optical material; and $\nu_j$ is the Abbe number of the $j^{th}$ optical material;

| Surface No. | $r_i$ | $d_i$ | $n_j$ | $\nu_j$ |
| --- | --- | --- | --- | --- |
| 1 | ∞ | 77.41 | 1.51633 | 64.1 |
| 2 | ∞ | 1.5 | | |
| 3 | 50.752 | 2 | 1.58547 | 29.9 |
| 4 | 20.5 | 1.747 | ~6.292 | |
| 5 | 23 | 4 | 1.49186 | 57.4 |
| 6 | −57.456 | | | | where: Distance from screen to the first surface : 3.1
Distance from the eighth surface
to eyepoint : 20.753–16.208
Effective field of view : 92%
$r_6/r_3 = -1.132$.

* * * * *